(12) United States Patent
Dickens et al.

(10) Patent No.: US 7,809,865 B2
(45) Date of Patent: Oct. 5, 2010

(54) APPARATUS AND METHOD TO SET A COMMUNICATION SPEED FOR A SAS/SATA DISTANCE EXTENDER

(75) Inventors: Louie Arthur Dickens, Tucson, AZ (US); Craig Anthony Klein, Tucson, AZ (US); Timothy A. Johnson, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/109,987

(22) Filed: Apr. 25, 2008

(65) Prior Publication Data

US 2009/0271546 A1 Oct. 29, 2009

(51) Int. Cl.
G06F 3/00 (2006.01)
G06F 5/00 (2006.01)

(52) U.S. Cl. .......................................... 710/60; 709/233
(58) Field of Classification Search .................... 710/60
See application file for complete search history.

(56) References Cited

U.S. PATENT DOCUMENTS

| 5,548,623 | A | 8/1996 | Casper et al. |
| 6,809,564 | B2 | 10/2004 | Hill |
| 7,054,947 | B2 * | 5/2006 | Yun ............................ 709/233 |
| 7,209,999 | B2 * | 4/2007 | Jamp et al. ................... 710/315 |
| 7,523,233 | B1 * | 4/2009 | Klein et al. .................... 710/62 |
| 2004/0243666 | A1 | 12/2004 | Wood |
| 2005/0055456 | A1 * | 3/2005 | Chalupsky et al. .......... 709/233 |
| 2005/0104636 | A1 | 5/2005 | Neuman |
| 2006/0026315 | A1 * | 2/2006 | Hong et al. .................... 710/60 |
| 2007/0223517 | A1 * | 9/2007 | Warren et al. ................ 370/463 |

* cited by examiner

Primary Examiner—Henry W Tsai
Assistant Examiner—Elias Mamo
(74) Attorney, Agent, or Firm—Dale F. Regelman; Quarles & Brady LLP

(57) ABSTRACT

A method to set a communication speed in a Serial-Attached Small Computer System Interface ("SAS")/Serial-ATA ("SATA") distance extender apparatus comprising a plurality of supported communication speeds and a local communication speed, a fibre channel interface, a memory, a processor, and a communication bus interconnecting the SAS/SATA Interface, the Fibre Channel interface, the memory, and the processor. The method detects traffic received by the Fibre Channel interface, and determines if the traffic comprises a SAS/SATA Open Address frame. If the traffic comprises a SAS/SATA Open Address frame, the method then determines if the local communication speed matches a communication speed utilized by an interconnected remote SAS/SATA Interface. If the local communication speed matches a communication speed utilized by an interconnected remote SAS/SATA Interface, the method transmits the traffic using the local SAS/SATA Interface.

18 Claims, 8 Drawing Sheets

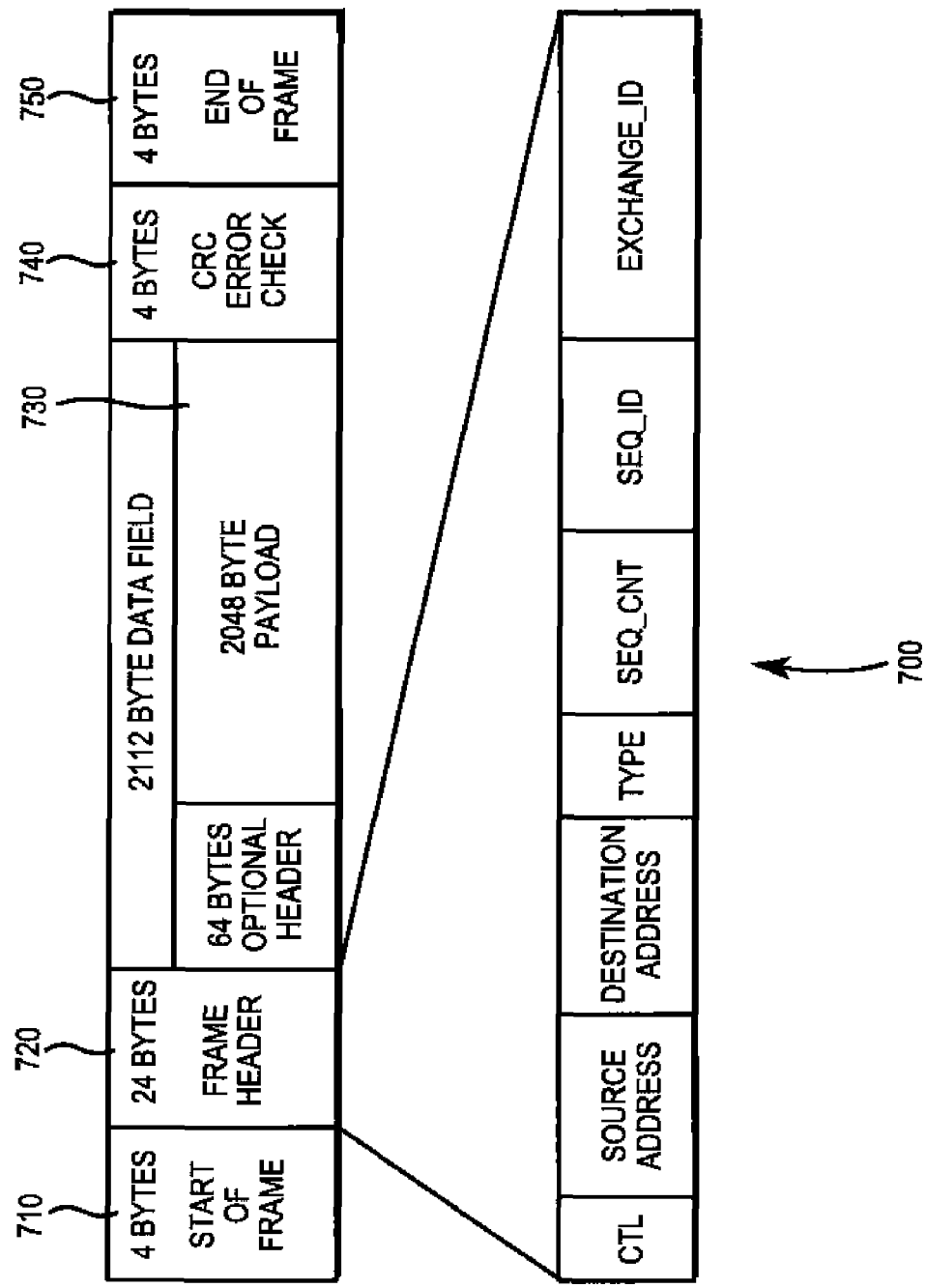

APPARATUS AND METHOD TO SET A COMMUNICATION SPEED FOR A SAS/SATA DISTANCE EXTENDER

FIELD OF THE INVENTION

The invention is directed to an apparatus and method to set a communication speed for a Serial Attached Small Computer System Interface ("SAS")/Serial-ATA ("SATA") distance extender apparatus.

BACKGROUND OF THE INVENTION

Serial-Attached Small Computer System Interface ("SAS") and Serial-ATA ("SATA") storage devices are widely used in computing devices. The transmission characteristics of these technologies, however, limits a connection distance to about 12 meters, thereby limiting the physical placement options available to storage system architects.

SUMMARY OF THE INVENTION

Applicants' invention comprises a method to set a communication speed in a Serial-Attached Small Computer System Interface ("SAS")/Serial-ATA ("SATA") distance extender apparatus comprising a SAS/SATA Interface comprising a plurality of supported communication speeds and a local communication speed, a fibre channel interface, a memory, a processor, and a communication bus interconnecting the SAS/SATA Interface, the Fibre Channel interface, the memory, and the processor. The method detects traffic received by the Fibre Channel interface, and determines if the traffic comprises a SAS/SATA Open Address frame.

If the traffic comprises a SAS/SATA Open Address frame, the method then determines if the local communication speed matches a communication speed utilized by an interconnected remote SAS/SATA Interface. If the local communication speed matches a communication speed utilized by an interconnected remote SAS/SATA Interface, the method transmits the traffic using the local SAS/SATA Interface.

BRIEF DESCRIPTION OF THE DRAWINGS

The invention will be better understood from a reading of the following detailed description taken in conjunction with the drawings in which like reference designators are used to designate like elements, and in which:

FIG. 6 is a block diagram illustrating the architecture of a Fibre Channel frame.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 5A:
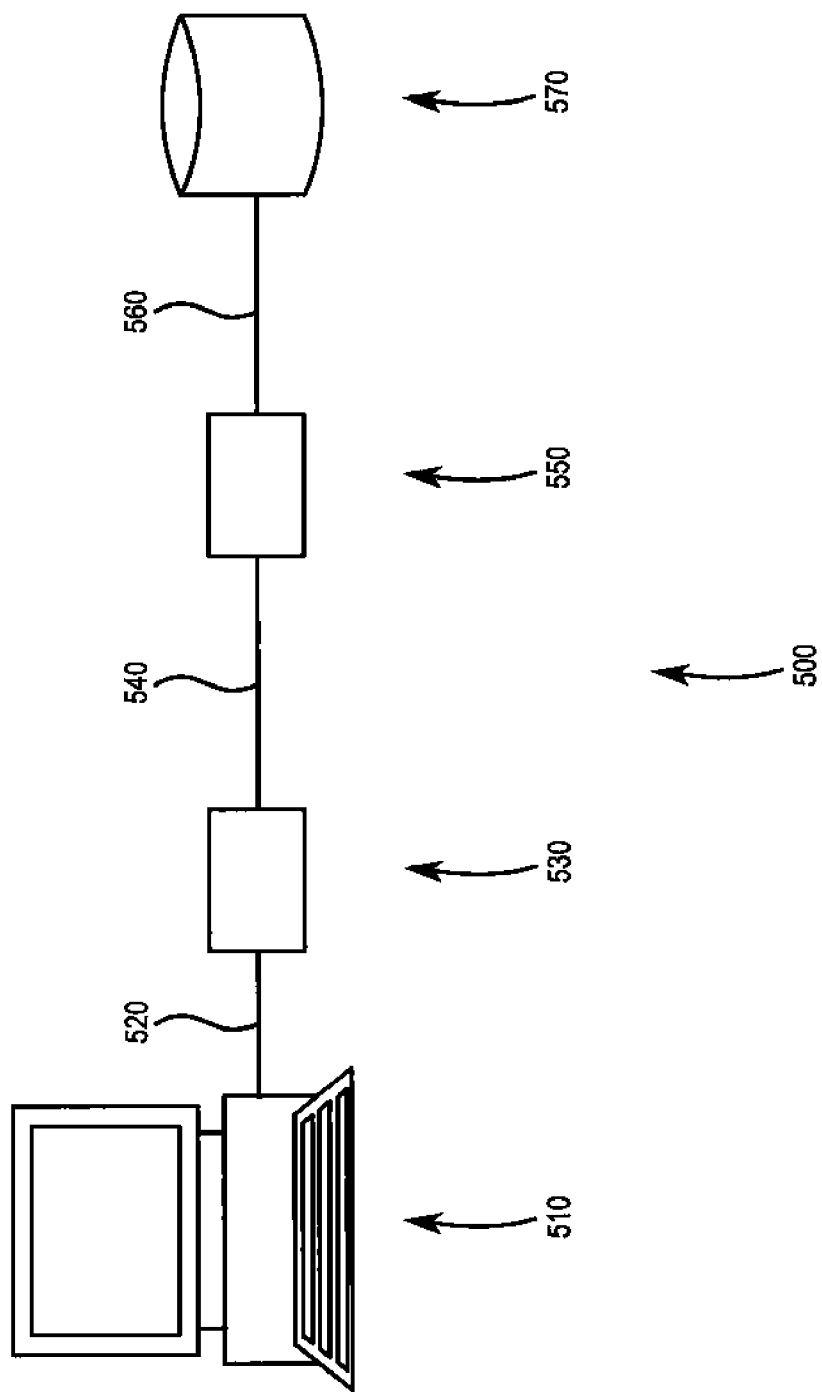
FIG. 5A illustrates one embodiment of Applicants' storage system.

FIG. 5A illustrates one embodiment of Applicants' storage system. In the illustrated embodiment of FIG. 5A, storage system 500 comprises initiator 510 first Serially-Attached Small Computer Storage Interface ("SAS")/Serial-ATA ("SATA") communication link 520, first SAS/SATA distance extender apparatus 530, Fibre Channel interface 540, second SAS/SATA distance extender apparatus 550, second SAS/SATA communication link 560, and target 570.

In certain embodiments, initiator 510 comprises a computing device such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, initiator 510 comprises a host computer which further includes a storage management program. In certain embodiments, that storage management program may include the functionality of storage management type programs known in the art that manage the transfer of data to and from a data storage and retrieval system, such as for example and without limitation the IBM DFSMS implemented in the IBM MVS operating system.

In certain embodiments, target 570 comprises one or more data storage media. By "data storage media," Applicants mean one or more magnetic storage media, one or more optical storage media, one or more electronic storage media, one or more holographic storage media, and combinations thereof, in combination with hardware, firmware, and software, needed to write information to, and read information from, those one or more storage media. In certain embodiments, target 570 comprises a plurality of data storage media configured to utilize one or more RAID protocols.

Figure 5B:
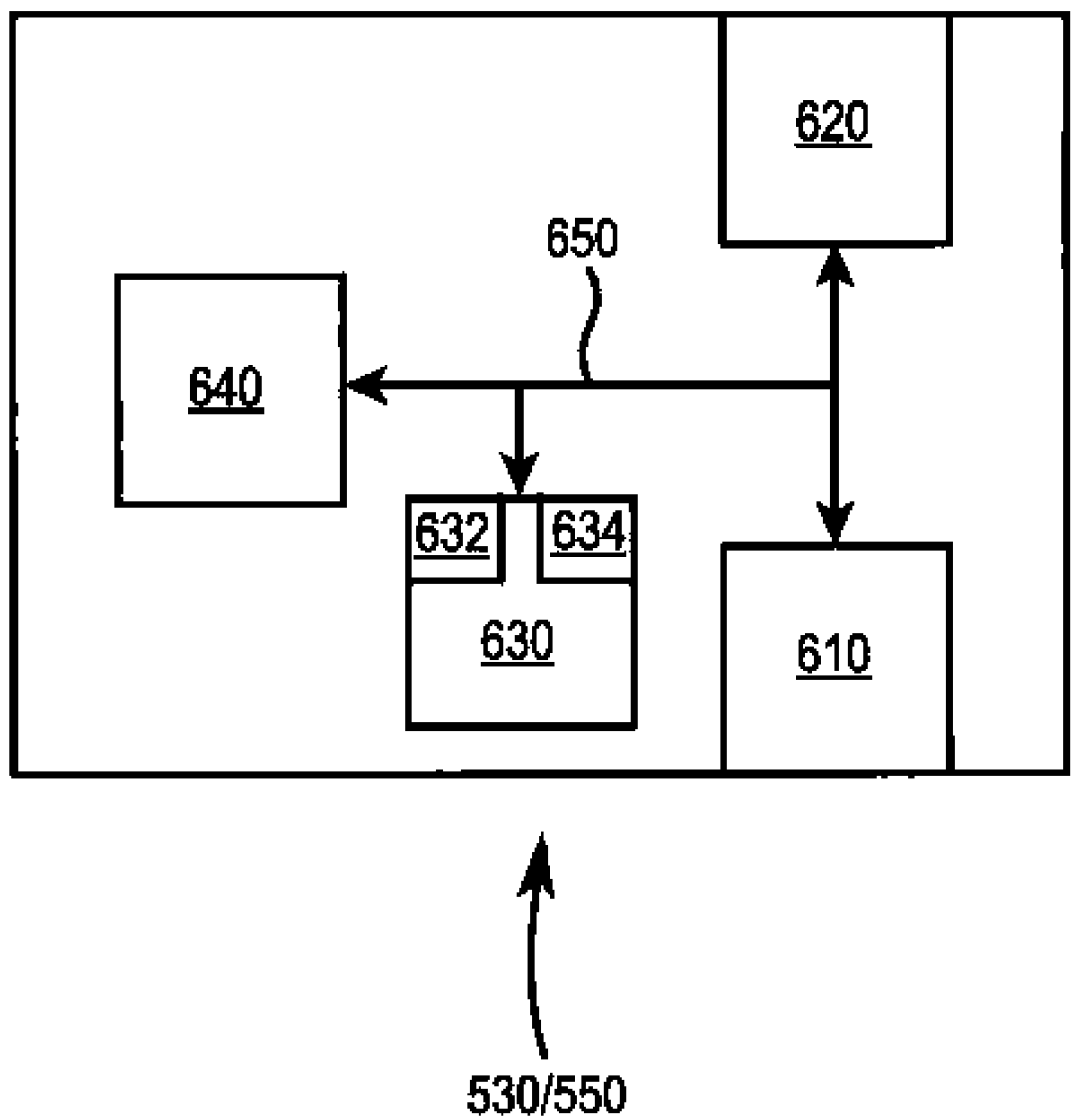
FIG. 5B is a block diagram illustrating the elements of Applicants' SAS/SATA distance extender apparatus.

FIG. 5B illustrates SAS/SATA distance extender apparatus 530/550. Extenders 530 and 550 comprise Fibre Channel interface 610, SAS Interface 620, memory 630, and processor 640. Communication bus 650 interconnects Fibre Channel interface 610, SAS Interface 620, memory 630, and processor 640.

In certain embodiments, memory 630 comprises one or more magnetic storage media, one or more optical storage media, one or more electronic storage media, one or more holographic storage media, and combinations thereof in combination with hardware, firmware, and software, needed to write information to, and read information from, those one or more storage media.

In the illustrated embodiment of FIG. 5B, microcode 632 is encoded in memory 630. Processor 640 utilizes microcode 632 to operate SAS/SATA distance extender apparatus 530/550. In the illustrated embodiment of FIG. 5B, instructions 634 are encoded in memory 630. Processor 640 utilizes instructions 634 to implement the steps of Applicants' speed-negotiating method described hereinbelow.

FIGS. 1, 2, 3, and 4, summarize the steps of Applicants' method. In certain embodiments, the method of FIGS. 1, 2, 3, and 4, may be separately implemented by a more than one SAS/SATA distance extender apparatus, such as SAS/SATA distance extender apparatus 530 (FIGS. 5A, 5B, 5C) and distance extender apparatus 550 (FIGS. 5A, 5B, 5C).

Figure 1:
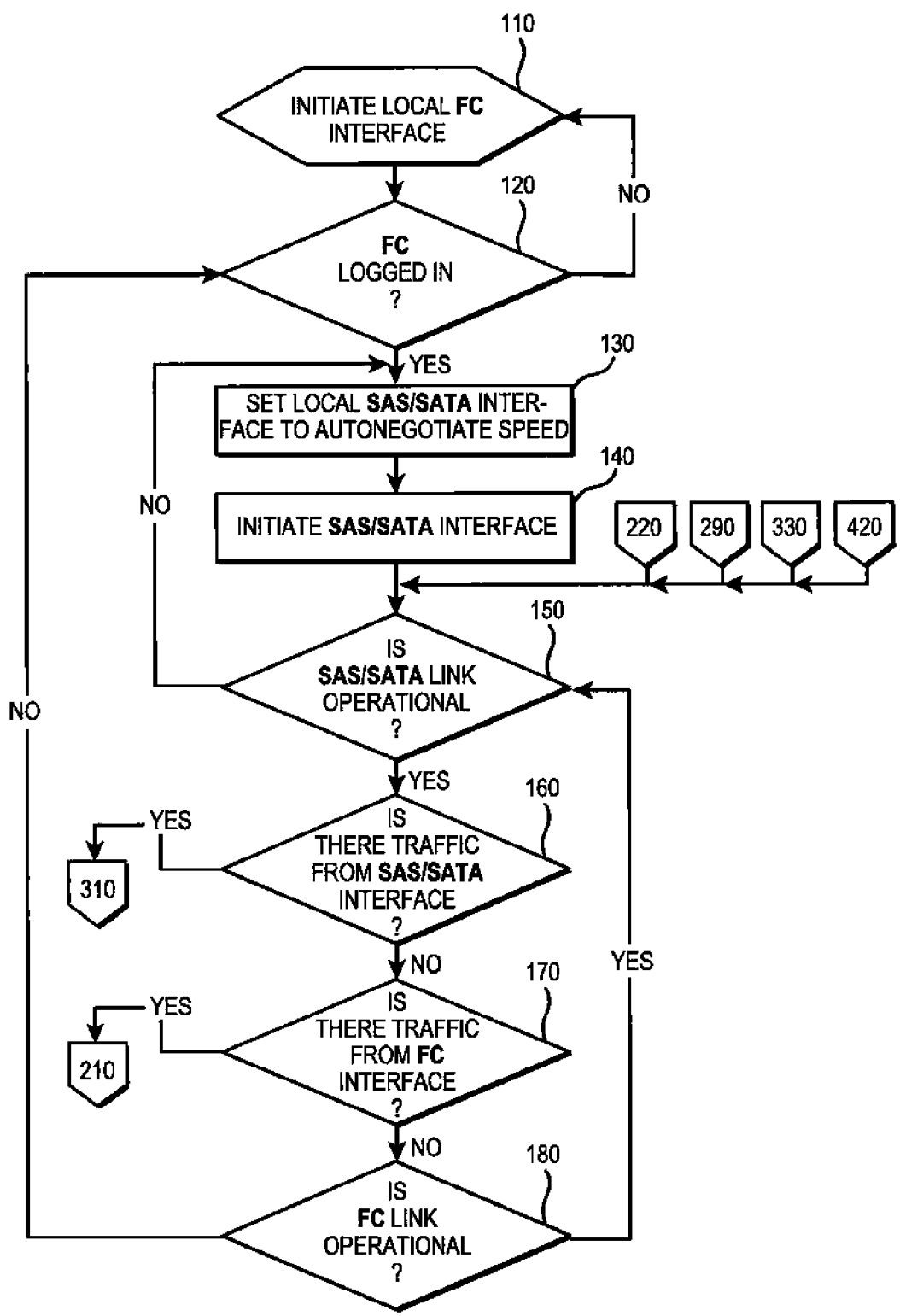
FIG. 1 is a flow chart summarizing the initial steps of Applicant's method.
Figure 5C:
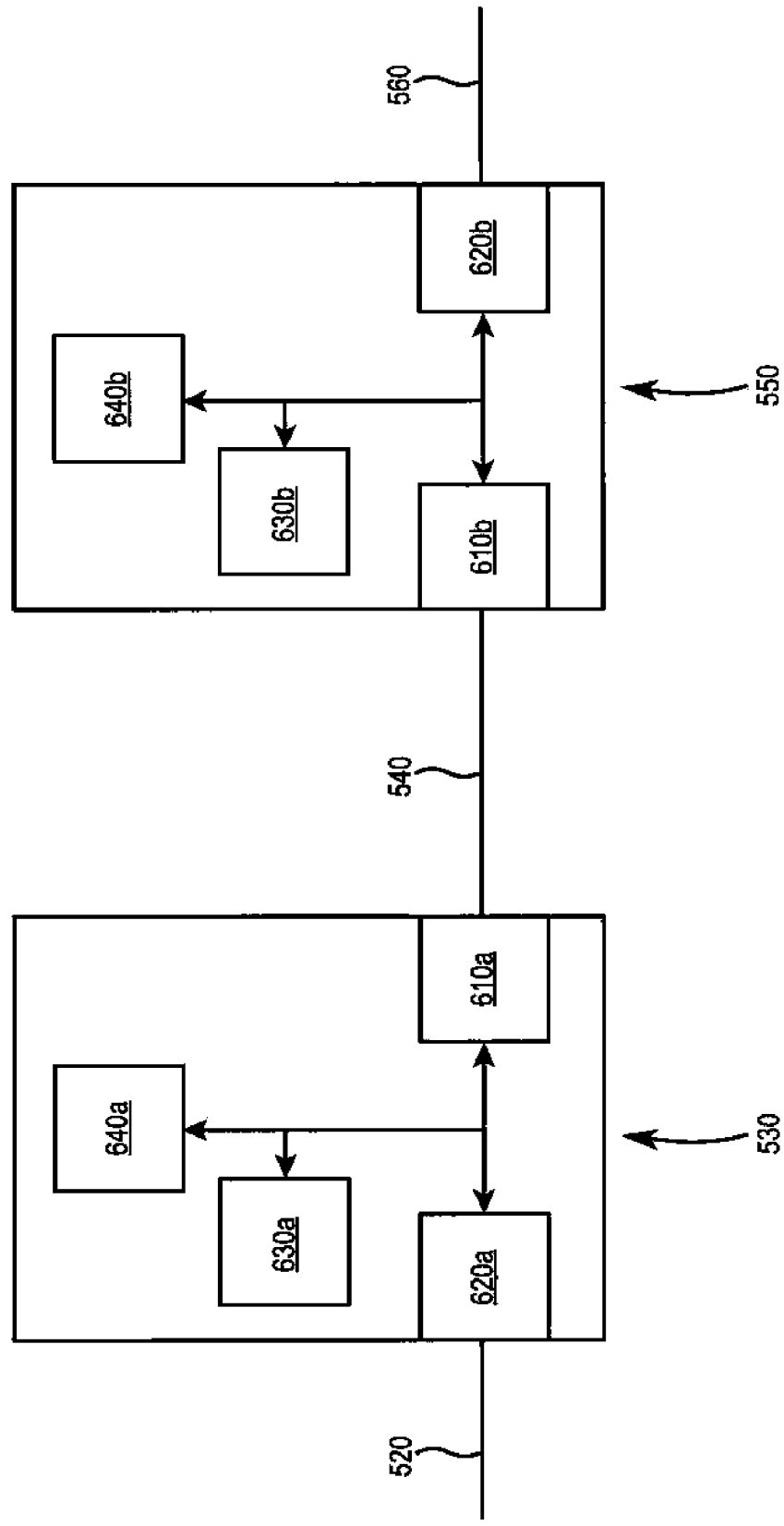
FIG. 5C illustrates a first and a second SAS/SATA Distance Extender Apparatus interconnected via a SAS/SATA communication link.

Referring now to FIGS. 1 and 5C, in step 110 the method initiates a local Fibre Channel Interface, such as for example Fibre Channel Interface 610a (FIG. 5C) disposed in a local SAS/SATA distance extender apparatus 530. In certain embodiments, step 110 is performed by a local processor, such as processor 640a (FIG. 5C), in communication with the local Fibre Channel Interface.

In step 120, the method determines if the Fibre Channel Interface of step 110, such as Fibre Channel Interface 610a, is logged in to a remote Fibre Channel Interface, such as Fibre Channel Interface 610b, disposed in an interconnected remote SAS/SATA distance extender apparatus, such as distance extender apparatus 550. In the illustrated embodiment of FIG. 5C, distance extender apparatus 550 comprises Fibre Channel Interface 610b, SAS Interface 620b, memory 630b, and processor 640b.

In certain embodiments, step 120 is performed by a local processor, such as processor 640a (FIG. 5C), in communication with the local Fibre Channel Interface 610a. If the answer is no in step 120, the method the method transitions from step 120 to step 110 and continues as described herein.

If the answer is YES in step 120, the method proceeds to step 130, where the method sets the local SAS/SATA Interface, such as local SAS/SATA Interface 620a, to autonegotiate its interface speed. In certain embodiments, step 130 is performed by a local processor, such as processor 640a (FIG. 5C), in communication with the local SAS/SATA Interface.

In step 140, the method initiates the local SAS/SATA Interface. In certain embodiments, step 140 is performed by a local processor, such as processor 640a (FIG. 5C), in communication with the local SAS/SATA Interface 620a.

In step 150, the method determines if a SAS/SATA communication link interconnecting the local and remote SAS/SATA Interfaces is operational. In certain embodiments, step 150 is performed by a local processor, such as processor 640a (FIG. 5C), in communication with the local SAS/SATA Interface.

If the method determines in step 150 that the SAS/SATA communication link is not operational, then the method transitions from step 150 to step 130 and continues as described herein. Alternatively, if the method determines in step 150 that the SAS/SATA communication link is operational, then the method transitions from step 150 to step 160 wherein the method determines if traffic has been received and buffered by the local SAS/SATA Interface, such as local SAS/SATA Interface 620a. By "traffic," Applicants mean data transmitted bi-directionally between initiator 510 (FIG. 5A) and target 570 (FIG. 5A), and/or storage commands/responses transmitted bi-directionally between initiator 510 and target 570.

In certain embodiments, traffic received by the local SAS/SATA Interface is buffered in the local memory, such as for example local memory 630a (FIG. 5C). In certain embodiments, step 160 is performed by a local processor, such as processor 640a (FIG. 5C), in communication with the local SAS/SATA Interface.

Figure 3:
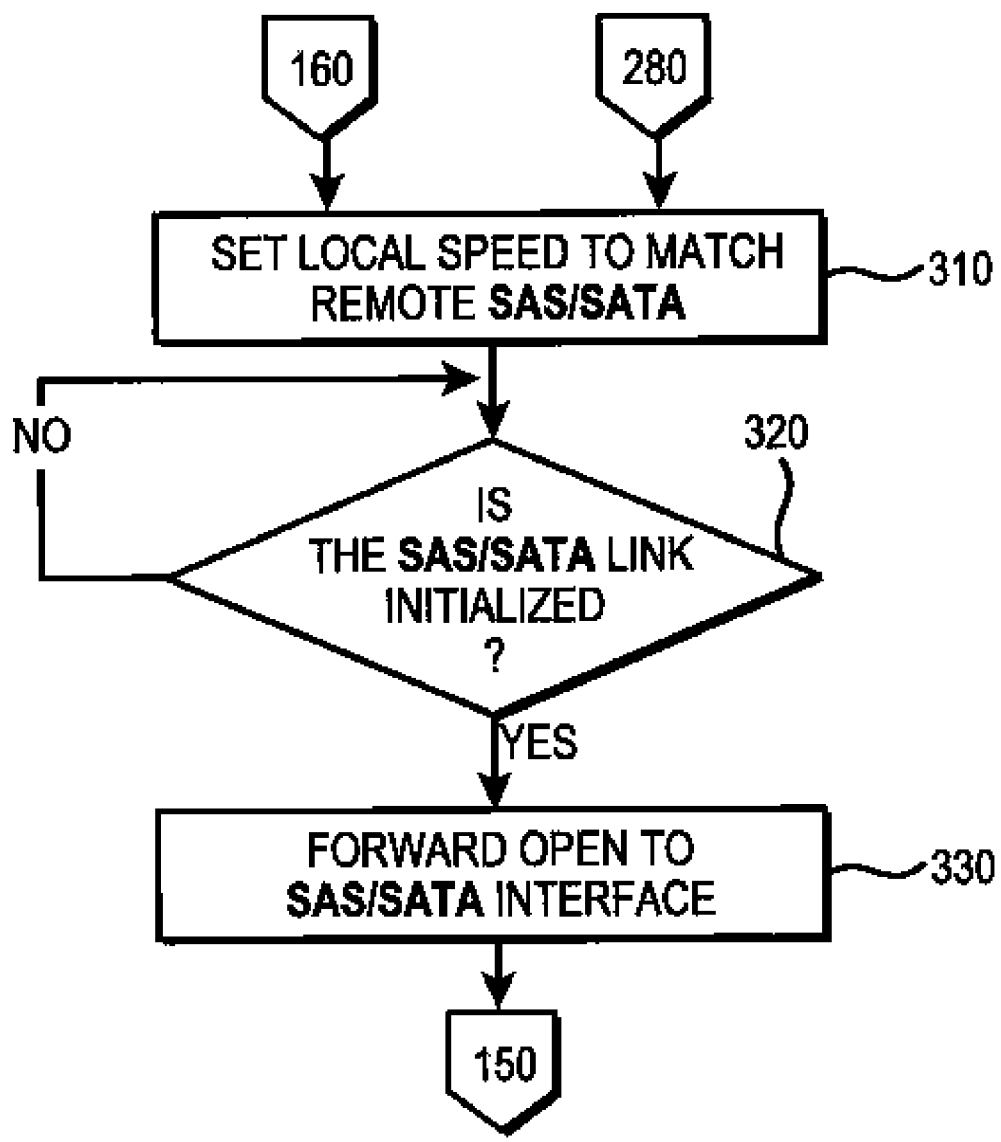
FIG. 3 is a flow chart summarizing certain additional steps of Applicants' method.

If the method determines in step 160 that traffic has been received by the local SAS/SATA Interface, then the method transitions from step 160 to step 310 (FIG. 3). Alternatively, if the method determines in step 160 that no traffic has been received by the local SAS/SATA Interface, then the method transitions from step 160 to step 170 wherein the method determines if traffic has been received and buffered by the local Fibre Channel Interface, such as local Fibre Channel Interface 610a. In certain embodiments, traffic received by the local Fibre Channel Interface is buffered in the local memory, such as for example local memory 630a. In certain embodiments, step 170 is performed by a local processor, such as processor 640a (FIG. 5C), in communication with the local Fibre Channel Interface.

Figure 2:
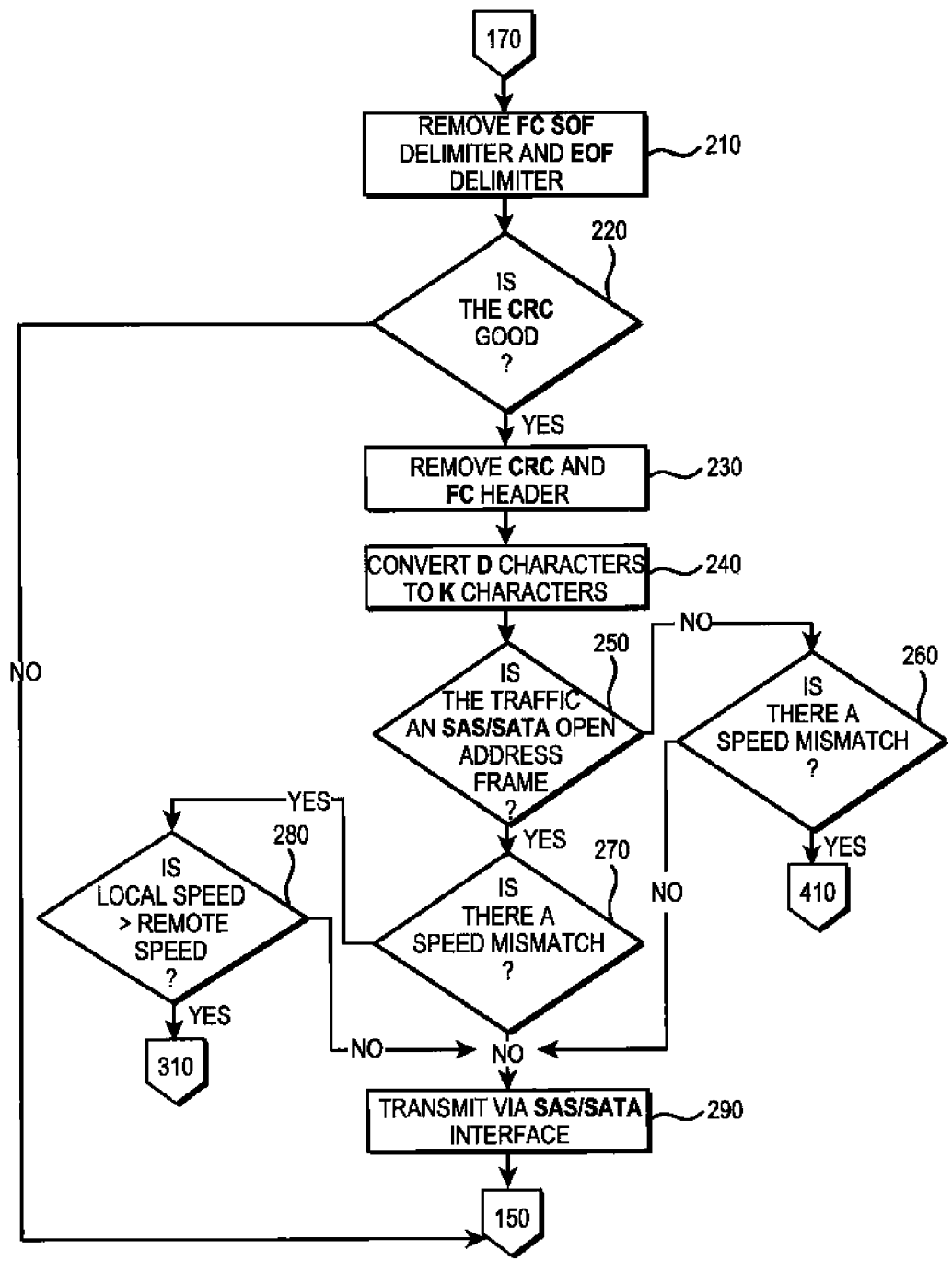
FIG. 2 is a flow chart summarizing certain additional steps of Applicants' method.

If the method determines in step 170 that traffic has been received by the local Fibre Channel Interface, then the method transitions from step 170 to step 210 (FIG. 2). Alternatively, if the method determines in step 170 that no traffic has been received by the local Fibre Channel Interface, then the method transitions from step 170 to step 180 wherein the method determines if the Fibre Channel link is still operational. In certain embodiments, step 180 is performed by a local processor, such as processor 640a (FIG. 5C), in communication with the local Fibre Channel Interface.

If the method determines in step 180 that the Fibre Channel link is still operational, then the method transitions from step 180 to step 150 and continues as described herein. If the method determines in step 180 that the Fibre Channel link is not operational, then the method transitions from step 180 to step 120 and continues as described herein.

Referring now to FIGS. 2 and 6, if the method determines in step 170 (FIG. 1) that traffic has been received by the local Fibre Channel Interface, then the method transitions from step 170 to step 210 wherein the method removes the Fibre Channel Start Of Frame delimiter and End Of Frame delimiter from the buffered traffic. In certain embodiments, step 210 is performed by a local processor, such as processor 640a (FIG. 5C), in communication with the local Fibre Channel Interface.

As those skilled in the art will appreciate, the basic building blocks of Fibre Channel ("FC") traffic comprise FC Frames. FC Frames contain the information to be transmitted ("Payload"), in combination with the address of the source and destination ports, and link control information. FC Frames are broadly categorized as Data frames and Link_control frames.

Each FC Frame begins with a Start Of Frame ("SOF") delimiter 710, and ends with an End Of Frame ("EOF") delimiter 750. Frame Header 720 immediately follows the SOF delimiter. Frame Header 720 is used to control link applications, control device protocol transfers, and defect missing or out of order Frames. An optional header may contain further link control information. A maximum 2112 byte long data field comprising a 64 byte optional header and 2048 byte Payload 730, which contains the information to be transferred from a Source Port to a Destination Port. The 4 bytes Cyclic Redundancy Check ("CRC") 740 precedes the EOF delimiter 740. The CRC 740 is used to detect transmission errors.

In step 220, the method determines a calculated CRC on the Payload 730, determines if the calculated CRC matches the transmitted CRC 740. In certain embodiments, step 220 is performed by a local processor, such as processor 640a (FIG. 5C), in communication with the local Fibre Channel Interface that received the one or more PC Frames.

If the method determines in step 220 that the calculated CRC does not match the transmitted CRC 740, then the method transitions from step 220 to step 150 and continues as described herein. Alternatively, if the method determines in step 220 that the calculated CRC matches the transmitted CRC 740, then the method transitions from step 220 to step 230 wherein the method removes the CRC element 740 and FC header 720 from each Fibre Channel Frame received and buffered. In certain embodiments, step 230 is performed by a local processor, such as processor 640a (FIG. 5C), in communication with the local Fibre Channel Interface.

In step 240, the method converts encoded D characters to corresponding K characters comprising SAS/SATA SOF and EOF, or encapsulated primitives. In certain embodiments, step 240 is performed by a local processor, such as processor 640a (FIG. 5C), in communication with the local SAS/SATA Interface.

In step 250, the method determines if the traffic comprises a SAS/SATA Open Address Frame. In certain embodiments, step 250 is performed by a local processor, such as processor 640a (FIG. 5C), in communication with the local Fibre Channel Interface. As those skilled in the art will appreciate, an Open Address Frame is used to open a connection. The connection is officially 'open' when the addressed destination responds by sending the Open Accept primitive back. That Open Accept primitive provided by the remote SAS/SATA Interface indicates if the speed set in the Open Address frame is acceptable.

If the method determines in step 250 that the traffic comprises a SAS/SATA Open Address Frame, the method transitions from step 250 to step 270 wherein the method determines if a communication speed mismatch exists, i.e. if a communication speed recited in the Open Address frame received from a remote SAS/SATA Interface comprises a communication speed supported by the local SAS/SATA Interface. In certain embodiments, step 250 is performed by a local processor, such as processor 640a (FIG. 5C), in communication with the local SAS/SATA Interface.

If the method determines in step 270 that a communication speed mismatch does not exist, then the method transitions from step 270 to step 290 wherein the method transmits the traffic of step 240 via a local SAS/SATA Interface, such as SAS/SATA Interface 620a. In certain embodiments, step 260 is performed by a local processor, such as processor 640a (FIG. 5C), in communication with the local SAS/SATA Interface.

If the method determines in step 270 that a communication speed mismatch does exist, then the method transitions from step 270 to step 280 wherein the method determines if the local communication speed is greater than the remote communication speed. In certain embodiments, step 280 is performed by a local processor, such as processor 640a (FIG. 5C), in communication with the local SAS/SATA Interface.

If the method determines in step 280 that the local communication speed is not greater than the remote communication speed, then the method transitions from step 280 to step 290 and continues as described herein. Alternatively, if the method determines in step 280 that the local communication speed is greater than the remote communication speed, then the method transitions from step 280 to step 310 (FIG. 3).

If the method determines in step 250 that the traffic does not comprise a SAS/SATA Open Address Frame, the method transitions from step 250 to step 260 wherein the method checks for an Open Address Reject primitive indicating a communication speed mismatch. In certain embodiments, step 260 is performed by a local processor, such as processor 640a (FIG. 5C), in communication with the local SAS/SATA Interface.

Figure 4:
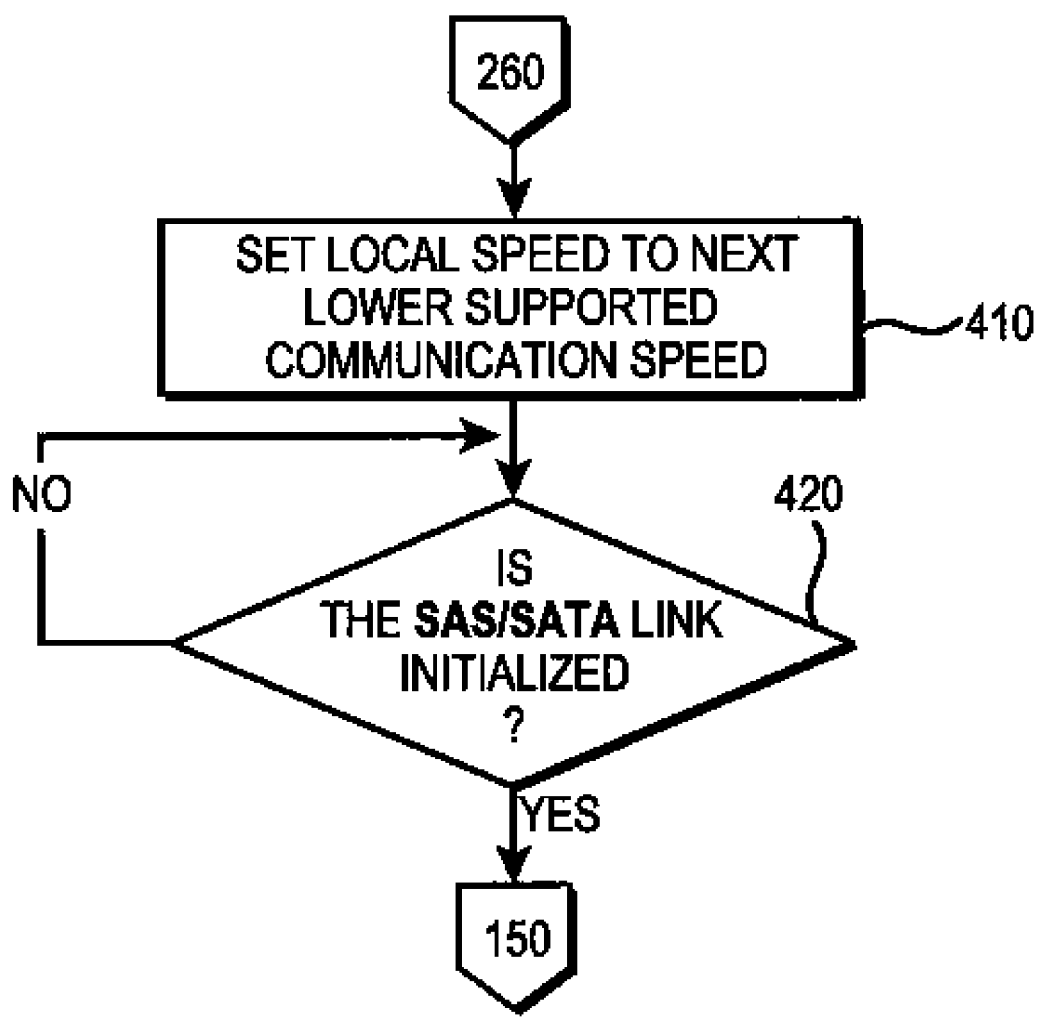
FIG. 4 is a flow chart summarizing certain additional steps of Applicants' method.

If the method determines in step 260 that the traffic does not comprise an Open Address Reject primitive indicating a speed mismatch, then the method transitions from step 260 to step 290 and continues as described herein. Alternatively, if the method determines in step 260 that the traffic does comprise an Open Address Reject primitive indicating a speed mismatch, then the method transitions from step 260 to step 410 (FIG. 4).

Referring now to FIG. 3, if the method determines in step 160 (FIG. 1) that traffic has been received by a local SAS/SATA Interface, then the method transitions from step 160 to step 310. In addition, if the method determines in step 250 (FIG. 2) that an Open Accept primitive reciting a remote communication speed has been received, and determines in step 270 (FIG. 2) that a communication speed mismatch exists between the local SAS/SATA Interface and the remote SAS/SATA Interface, and determines in step 280 (FIG. 2) that the local speed is greater than the remote speed, then the method transitions from step 280 to step 310.

In step 310, the method sets the local SAS/SATA Interface communication speed to match the remote SAS/SATA Interface communication speed. By "match the remote SAS/SATA Interface communication speed", Applicants mean to set the local communication speed equal to the remote communication speed, within about plus or minus ten percent (10%). In certain embodiments, step 310 is performed by a local processor, such as processor 640a (FIG. 5C), in communication with the local SAS/SATA Interface.

In step 320, the method determines if the SAS/SATA communication link is initialized. In certain embodiments, step 320 is performed by a local processor, such as processor 640a (FIG. 5C), in communication with the local SAS/SATA Interface.

If the method determines in step 320 that the SAS/SATA communication link is not initialized, then the method pauses at step 320 while rechecking to determine when the SAS/SATA communication link becomes operational. Alternatively, if the method determines in step 320 that the SAS/SATA communication link is initialized, then the method transitions from step 320 to step 330 wherein the method transmits an Open Address frame comprising the traffic of step 240 (FIG. 2) to the remote SAS/SATA Interface. In certain embodiments, step 330 is performed by a local processor, such as processor 640a (FIG. 5C), in communication with the local SAS/SATA Interface. The method transitions from step 330 to step 150 (FIG. 1), and continues as described herein.

Referring now to FIG. 4, if the method determines in step 250 (FIG. 2) that the traffic does not comprise a SAS/SATA Open Address Frame, and if in step 260 the method detects an Open Address Reject primitive indicating a speed mismatch, then the method transitions from step 260 to step 410 wherein the method sets the local SAS/SATA Interface communication speed to a next lower supported communication speed. In certain embodiments, step 410 is performed by a local processor, such as processor 640a (FIG. 5C), in communication with the local SAS/SATA Interface.

In step 420, the method determines if the SAS/SATA communication link is initialized. In certain embodiments, step 420 is performed by a local processor, such as processor 640a (FIG. 5C), in communication with the local SAS/SATA Interface.

If the method determines in step 420 that the SAS/SATA communication link is not initialized, then the method pauses at step 420 while rechecking to determine when the SAS/SATA communication link becomes operational. Alternatively, if the method determines in step 420 that the SAS/SATA communication link is initialized, then the method transitions from step 420 to step 150 (FIG. 1), and continues as described herein.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to set a communication speed in a serial attached small computer system interface ("SAS") and serial-ATA ("SATA") distance extender apparatus, comprising the steps of:
   supplying a SAS/SATA distance extender apparatus comprising a SAS/SATA interface comprising a plurality of supported communication speeds and a local communication speed, a fibre channel interface, a memory, a processor, and a communication bus interconnecting said SAS/SATA interface, said Fibre Channel interface, said memory, and said processor;
   detecting traffic received by said Fibre Channel interface;
   determining if said traffic comprises a SAS/SATA Open Address frame;
   operative if said traffic comprises a SAS/SATA Open Address frame, determining if said local communication speed matches a communication speed utilized by an interconnected remote SAS/SATA interface;
   operative if said local communication speed matches a remote communication speed utilized by an interconnected remote SAS/SATA interface, transmitting said traffic using said local SAS/SATA interface,
   wherein if a local Fibre Channel interface has received traffic, further comprising the steps of: removing Fibre Channel Start Of Frame delimiter and End Of Frame delimiter; removing a CRC portion of said traffic; and converting in said traffic D characters to corresponding K characters.

2. The method of claim 1, further comprising the steps of:
   operative if said local communication speed does not match a communication speed utilized by an interconnected remote SAS/SATA interface, determining if said local communication speed is greater than said communication speed utilized by an interconnected remote SAS/SATA interface;
   operative if said local communication speed is not greater than said communication speed utilized by an interconnected remote SAS/SATA interface, transmitting said traffic using said local SAS/SATA interface.

3. The method of claim 2, further comprising the steps of:
   operative if said local communication speed is greater than said communication speed utilized by an interconnected remote SAS/SATA interface, setting said local communication speed to match said communication speed utilized by an interconnected remote SAS/SATA interface;
   determining if a SAS/SATA communication link between said local SAS/SATA interface and said remote SAS/SATA interface is initialized;
   operative if a SAS/SATA communication link between said local SAS/SATA interface and said remote SAS/SATA interface is initialized, transmitting said traffic using said local SAS/SATA interface.

4. The method of claim 1, further comprising the steps of:
   operative if said traffic does not comprise a SAS/SATA Open Address frame, determining if said local communication speed matches said remote communication speed;
   operative if said local communication speed matches a communication speed utilized by an interconnected remote SAS/SATA interface, transmitting said traffic using said local SAS/SATA interface.

5. The method of claim 4, wherein said local communication speed does not match said remote communication speed, further comprising the step of setting said local communication speed to a next lower support communication speed.

6. The method of claim 1, further comprising the steps of:
   initiating said local Fibre Channel interface;
   initiating said local SAS/SATA interface;
   determining if said local SAS/SATA interface has received traffic; and
   determining if said local Fibre Channel interface has received traffic.

7. An apparatus comprising a processor, a memory, a SAS/SATA Interface comprising a plurality of supported communication speeds and a local communication speed, a Fibre Channel Interface, a communication bus interconnecting said processor, said memory, said SAS/SATA Interface, said Fibre Channel Interface, a computer readable non-transitory storage medium, and computer readable program code encoded in said computer readable non-transitory storage medium, said program readable code being useable with said processor to set a communication speed for said SAS/SATA Interface, the computer readable program code comprising a series of computer readable program steps to effect:
   detecting traffic received by said Fibre Channel interface;
   determining if said traffic comprises a SAS/SATA Open Address frame;
   operative if said traffic comprises a SAS/SATA Open Address frame, determining if said local communication speed matches a remote communication speed utilized by an interconnected remote SAS/SATA interface;
   operative if said local communication speed matches a communication speed utilized by an interconnected remote SAS/SATA interface, transmitting said traffic using said local SAS/SATA interface,
   wherein if a local Fibre Channel interface has received traffic, said computer readable program code further comprising a series of computer readable program steps to effect: removing Fibre Channel Start Of Frame delimiter and End Of Frame delimiter from said traffic; removing a CRC portion of said traffic; and converting in said traffic D characters to corresponding K characters.

8. The apparatus of claim 7, said computer readable program code further comprising a series of computer readable program steps to effect:
   operative if said local communication speed does not match a communication speed utilized by an interconnected remote SAS/SATA interface, determining if said local communication speed is greater than said communication speed utilized by an interconnected remote SAS/SATA interface;

operative if said local communication speed is not greater than said communication speed utilized by an interconnected remote SAS/SATA interface, transmitting said traffic using said local SAS/SATA interface.

9. The apparatus of claim 8, said computer readable program code further comprising a series of computer readable program steps to effect:

operative if said local communication speed is greater than said communication speed utilized by an interconnected remote SAS/SATA interface, setting said local communication speed to match said communication speed utilized by an interconnected remote SAS/SATA interface;

determining if a SAS/SATA communication link between said local SAS/SATA interface and said remote SAS/SATA interface is initialized;

operative if a SAS/SATA communication link between said local SAS/SATA interface and said remote SAS/SATA interface is initialized, transmitting said traffic using said local SAS/SATA interface.

10. The manufacture apparatus of claim 7, said computer readable program code further comprising a series of computer readable program steps to effect:

operative if said traffic does not comprise a SAS/SATA Open Address frame, determining if said local communication speed matches said remote communication speed;

operative if said local communication speed matches a communication speed utilized by an interconnected remote SAS/SATA interface, transmitting said traffic using said local SAS/SATA interface.

11. The apparatus of claim 10, said computer readable program code further comprising a series of computer readable program steps to, if said local communication speed does not match said remote communication speed, set said local communication speed to a next lower support communication speed.

12. The apparatus of claim 7, said computer readable program code further comprising a series of computer readable program steps to effect:

initiating said local Fibre Channel interface;
initiating said local SAS/SATA interface;
determining if said local SAS/SATA interface has received traffic; and
determining if said local Fibre Channel interface has received traffic.

13. A computer program product encoded in a computer readable non-transitory storage medium, said computer program product being useable to set a communication speed for a SAS/SATA Interface comprising a plurality of supported communication speeds and a local communication speed and disposed in a SAS/SATA distance extender apparatus, wherein said SAS/SATA distance extender apparatus further comprises a fibre channel interface, a memory, a programmable computer processor, and a communication bus interconnecting said SAS/SATA interface, said Fibre Channel interface, said memory, and said processor, wherein said local SAS/SATA interface comprises a plurality of supported communication speeds and a local communication speed, comprising:

computer readable program code which causes said programmable computer processor to detect traffic received by said Fibre Channel interface; computer readable program code which causes said programmable computer processor to determine if said traffic comprises a SAS/SATA Open Address frame;

computer readable program code which, if said traffic comprises a SAS/SATA Open Address frame, causes said programmable computer processor to determine if said local communication speed matches a remote communication speed utilized by an interconnected remote SAS/SATA interface;

computer readable program code which, if said local communication speed matches a communication speed utilized by an interconnected remote SAS/SATA interface, causes said programmable computer processor to transmit said traffic using said local SAS/SATA interface; and computer readable program code which causes said programmable computer processor to determine if a local Fibre Channel interface has received traffic; computer readable program code which, if said Fibre Channel interface has received traffic, causes said programmable computer processor to: remove Fibre Channel Start Of Frame delimiter and End Of Frame delimiter from said traffic; remove a CRC portion of said traffic; and convert in said traffic D characters to corresponding K characters.

14. The computer program product of claim 13, said computer readable program code further comprising a series of computer readable program steps to effect:

computer readable program code which, if said local communication speed does not match a communication speed utilized by an interconnected remote SAS/SATA interface, causes said programmable computer processor to determine if said local communication speed is greater than said communication speed utilized by an interconnected remote SAS/SATA interface;

computer readable program code which, if said local communication speed is not greater than said communication speed utilized by an interconnected remote SAS/SATA interface, causes said programmable computer processor to transmit said traffic using said local SAS/SATA interface.

15. The computer program product of claim 14, said computer readable program code further comprising a series of computer readable program steps to effect:

computer readable program code which, if said local communication speed is greater than said communication speed utilized by an interconnected remote SAS/SATA interface, causes said programmable computer processor to set said local communication speed to match said communication speed utilized by an interconnected remote SAS/SATA interface;

computer readable program code which causes said programmable computer processor to determine if a SAS/SATA communication link between said local SAS/SATA interface and said remote SAS/SATA interface is initialized;

computer readable program code which, if a SAS/SATA communication link between said local SAS/SATA interface and said remote SAS/SATA interface is initialized, causes said programmable computer processor to transmit said traffic using said local SAS/SATA interface.

16. The computer program product of claim 14, said computer readable program code further comprising a series of computer readable program steps to effect:

computer readable program code which, if said traffic does not comprise a SAS/SATA Open Address frame, causes said programmable computer processor to determine if said local communication speed matches said remote communication speed;

computer readable program code which, if said local communication speed matches a communication speed utilized by an interconnected remote SAS/SATA interface, causes said programmable computer processor to transmit said traffic using said local SAS/SATA interface.

17. The computer program product of claim 16, further comprising computer readable program code which, if said local communication speed does not match said remote communication speed, causes said programmable computer processor to set said local communication speed to a next lower supported communication speed.

18. The computer program product of claim 13, further comprising: computer readable program code which causes said programmable computer processor to initiate said local Fibre Channel interface; computer readable program code which causes said programmable computer processor to initiate said local SAS/SATA interface; computer readable program code which causes said programmable computer processor to determine if said local SAS/SATA interface has received traffic.

* * * * *